United States Patent [19]

Saele et al.

[11] 4,211,079
[45] Jul. 8, 1980

[54] POSITIVE NEUTRAL CONTROL FOR HYDROSTATIC TRANSMISSION

[75] Inventors: Arvid H. Saele, Dubuque; Donald O. Johannsen, Sherrill, both of Iowa

[73] Assignee: Deere & Company, Moline, Ill.

[21] Appl. No.: 33,769

[22] Filed: Apr. 27, 1979

[51] Int. Cl.² ............................................. F16H 39/46
[52] U.S. Cl. ...................................... 60/433; 60/444; 60/487; 91/506
[58] Field of Search ................. 60/433, 443, 444, 447, 60/487, DIG. 2, DIG. 10; 91/506

[56] References Cited

U.S. PATENT DOCUMENTS

| | | | |
|---|---|---|---|
| 3,411,297 | 11/1968 | Hann | 60/389 |
| 3,636,705 | 1/1972 | Howard et al. | 60/447 |
| 3,803,987 | 4/1974 | Knapp | 91/506 |

Primary Examiner—Edgar W. Geoghegan

[57] ABSTRACT

A hydrostatic transmission includes a reversible, variable displacement pump having a swashplate actuator controlled by a pilot-operated displacement control valve. A manually operated displacement control lever is manipulated to opposite sides of a neutral position to effect command signals for causing pilot operation of the displacement control valve to control movement of the swashplate in accordance with the command. A neutral control valve is coupled to the displacement control lever and is operated thereby to a neutral position, wherein it connects the swashplate actuator to sump, when the lever is moved to its neutral position.

4 Claims, 4 Drawing Figures

POSITIVE NEUTRAL CONTROL FOR HYDROSTATIC TRANSMISSION

BACKGROUND OF THE INVENTION

The present invention relates to controls for a hydrostatic transmission and more specifically relates to controls for effecting a positive neutral condition in the transmission when a control lever for the transmission is moved to a neutral position.

Hydrostatic transmissions of one known type include a reversible, variable displacement pump unit connected to a fixed or variable displacement motor unit such that the latter is caused to be driven at increasing speeds in forward and reverse respectively in response to a swashplate of the pump being increasingly angularly adjusted to opposite sides of a zero-displacement effecting neutral position.

The swashplates of such transmissions are normally adjusted by one double-acting or two single-acting hydraulic actuators, to and from which the flow of control fluid is controlled by a displacement control valve. Many of these transmissions, as exemplified by the transmission disclosed in U.S. Pat. No. 3,411,297 issued to Hann on Nov. 19, 1968, are controlled by displacement control valves actuated directly through a linkage connected to a manually operable control valve and including a feedback linkage coupled between the swashplate and the control valve such as to terminate flow to and from the swashplate actuator or actuators once the swashplate arrives at the position commanded by the control lever. The control linkages are constructed such as to place the valve in a neutral position connecting the swashplate actuator or actuators to sump when the control lever is in a corresponding neutral position and various provisions are made for adjusting the linkages such as to ensure that this correspondence in neutral positions will occur. Neutraling springs are provided in conjunction with the swashplate actuators such as to effect a zero-displacement condition in the pump in the absence of fluid pressure in the actuators.

Others of these transmissions, as exemplified by the transmissions respectively disclosed in U.S. Pat. No. 3,803,987, granted to Knapp on Apr. 16, 1974, and applicants' co-pending application Ser. No. 967,368 filed on Dec. 7, 1978, provide for pilot-operation of the displacement control valve. In the patented transmission, a control lever is connected to a fluid power spool and is operable to opposite sides of a neutral position to respectively cause the spool to force pilot pressure fluid to the opposite sides of a piston of a displacement control valve to effect shifting of the latter. When the spool is in a neutral position corresponding to the neutral position of the control lever, it acts to establish a float condition in the piston of the displacement control valve and neutraling springs act on both the spool and the piston to the end of having them positioned in respective neutral positions corresponding to the neutral position of the control lever. However, because there is considerable distance between the spool and the piston, there exists the danger that a malfunction may occur resulting in pressure fluid somehow becoming trapped in the pilot fluid passages extending between the spool and piston despite the fact that the control lever is placed in its neutral position.

As to the transmission disclosed in the aforementioned co-pending application, pilot operation of the displacement control valve is achieved electronically by providing an electric torque motor which is operative to effect a fluid pressure imbalance across a displacement control valve spool, which imbalance corresponds to the magnitude and direction of electrical command signals sent to the torque motor. A manually operable control lever acts on a variable potentiometer to produce increasing signals of opposite polarity respectively in response to the lever being increasingly displaced to opposite sides of a neutral position. The danger in this system is that the electric control circuitry may somehow malfunction to send a spurious control signal to the torque motor despite the fact that the control lever is in its neutral position.

SUMMARY OF THE INVENTION

The present invention relates to controls for hydrostatic transmissions and more particularly relates to positive neutral controls for hydrostatic transmissions including a reversible variable displacement pump having an angularly adjustable swashplate.

A broad object of the invention is to provide a control for ensuring that an angularly adjustable swashplate of a reversible variable displacement pump of a hydrostatic transmission will be in a centered, zero-displacement effecting position anytime a control lever, for effecting the transmission of a control signal to a pilot-operated displacement control valve, is in a neutral position.

A more specific object of the invention is to provide a neutral control valve, which is fluidly connected to control fluid lines connected between a pilot-operated displacement control valve and swashplate actuator means and mechanically connected to a command signal effecting control lever such that the control fluid is connected to sump whenever the lever is in a neutral position.

Another object of the invention is to provide a neutral start switch in combination with the positive neutral control valve such that starting of the vehicle engine is possible only when the neutral control valve is in its neutral position.

These and other objects will become apparent from a reading of the following description in conjunction with the appended drawings.

DESCRIPTION OF THE PREFERRED EMBODIMENT

Figure 1:
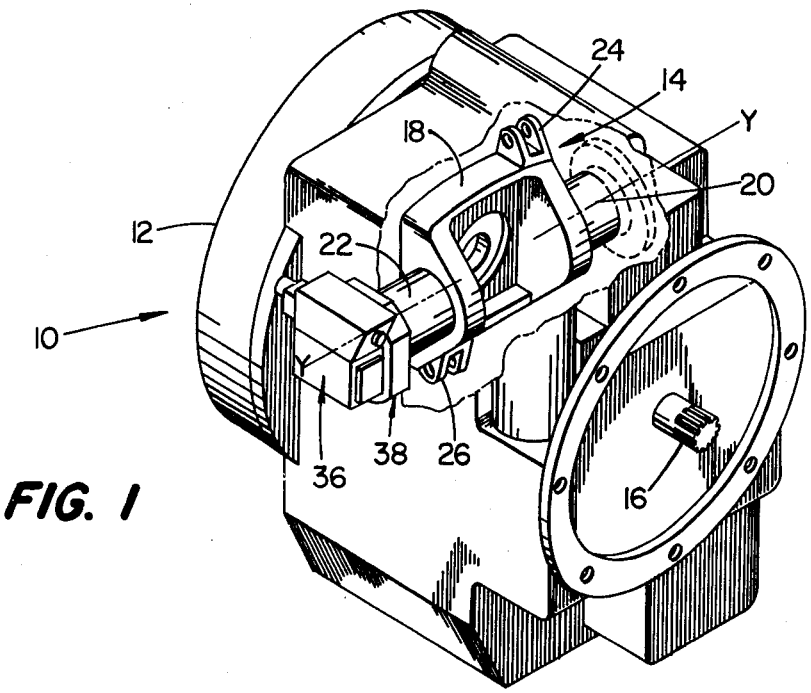
FIG. 1 is a somewhat schematic perspective view of a hydrostatic transmission embodying the present invention and having parts broken away and others removed for clarity.

Referring now to FIG. 1, therein is shown a hydrostatic transmission indicated in its entirety by the reference numeral 10. The transmission 10 includes a sealed case or housing 12 which contains a reversible, variable displacement pump 14, only partly shown. Also contained in the case 12 but not illustrated here is a fixed or a variable displacement motor and circuitry connecting the pump 14 to the motor such as to form a closed loop system, as is well known in the art. An input drive shaft 16 extends into and is supported by the case 12 and is coupled to the pump 14 for driving the latter by means of conventional gears and shafting, not shown.

The pump 14 includes a swashplate 18 rotatably supported on axially aligned right and left trunnions 20 and 22, respectively, fixed to the case 12. The swashplate 18 is thus mounted for angular adjustment about an axis Y, passing centrally through the trunnions for the purposes of effecting changes in the amount and direction of fluid displaced by the pump 14 and hence in the speed and direction of rotation of the unshown motor. Specifically, the swashplate 18 is here illustrated in a centered position wherein it effects a zero-displacement condition in the pump. As the angular displacement of the swashplate 18 from its centered position increases in opposite first and second angular directions, the fluid displaced by the pump 14 increases in opposite first and second directions therethrough.

Figure 2:
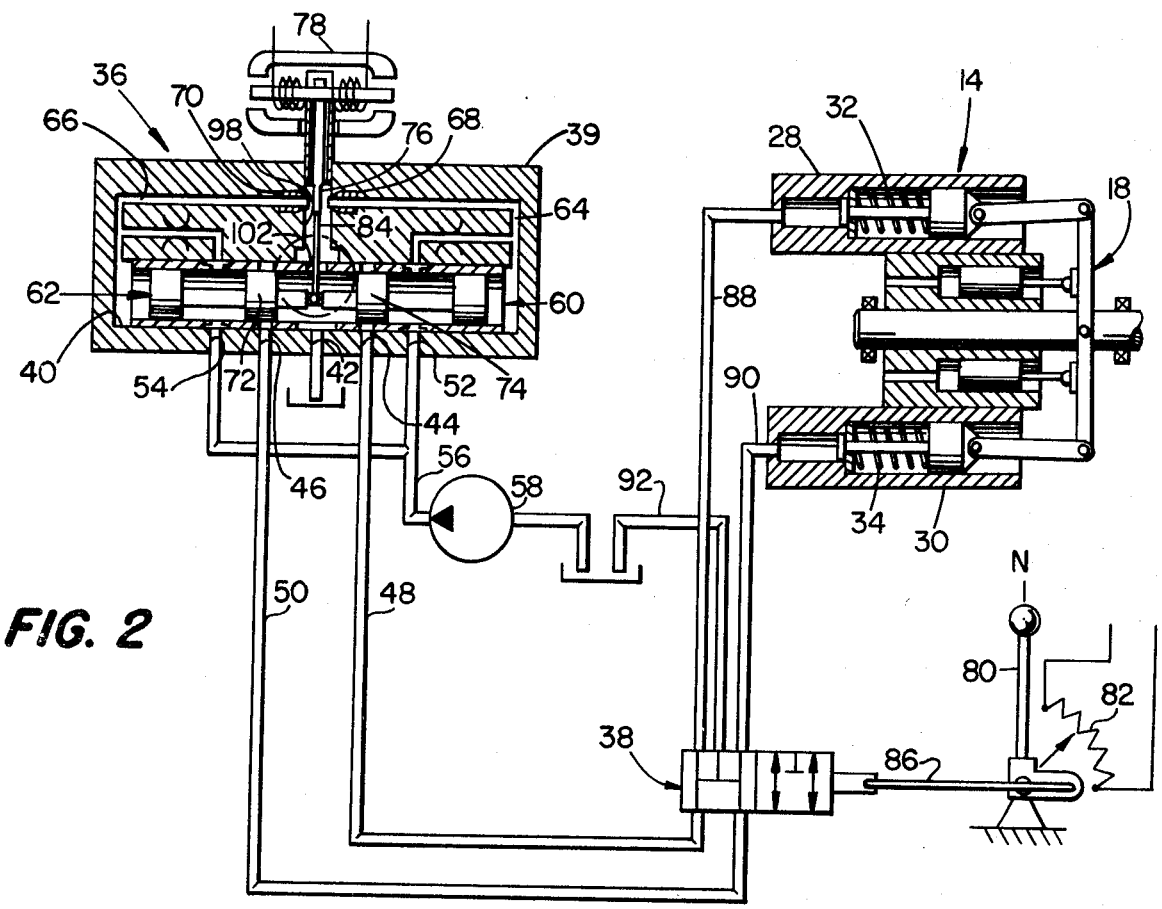
FIG. 2 is a schematic representation of the hydraulic system for controlling the displacement of the transmission pump and including a valve for effecting a positive neutral condition in the pump when a zero-displacement condition is commanded.

As can best be seen in FIG. 1, the swashplate 18 includes upper and lower connection brackets 24 and 26, respectively, located above and below the axis Y. Referring now to FIG. 2, it can be seen that upper and lower, single-acting hydraulic actuators 28 and 30, respectively, are connected to the brackets 24 and 26 for selectively effecting angular adjustment of the swashplate 18 when selectively pressurized. The actuators 28 and 30 respectively contain neutraling springs 32 and 34 for effecting a zero displacement condition in the pump 40 whenever both actuators 28 and 30 are depressurized.

The actuators 28 and 30 are, in turn, selectively controlled by means of a pilot-operated, electrohydraulic direction control valve 36 and a positive neutral control valve 38. Specifically, with reference to FIG. 2 it can be seen that the displacement control valve 36 includes a valve body 39 containing a valve bore 40 having a central location connected in fluid communication with the sump in a manner to be described in more detail below but here represented by the port 42. Respectively located to the right and left of the port 42 are control ports 44 and 46, which are respectively coupled to control passages 48 and 50. Located rightwardly of the port 44 is a supply port 52 and located leftwardly of the port 46 is a supply port 54, the ports 52 and 54 being connected to a branched supply passage 56 which is, in turn, coupled to a control fluid pressure supply pump 58.

Provided in the valve bore 40 for selectively controlling fluid communication between the supply and control ports are a follow-up sleeve 60 and a pilot-operated valve spool 62 contained within the sleeve. Coupled in fluid communication with the opposite ends of the valve spool 62 are right and left pilot pressure passages 64 and 66, respectively, which are in constant fluid communication with the supply ports 52 and 54 and respectively terminate in opposed nozzles 68 and 70. The spool 62 and sleeve 60 normally bear a centered relationship relative to each other, as illustrated, wherein a pair of lands 72 and 74 of the spool are positioned in blocking relationship to respective sets of ports in the sleeve leading to the control ports 44 and 46.

The pressure in the passages 64 and 66 and, hence, shifting of the valve spool 62 is controlled by a flapper valve 76 located between the nozzles 68 and 70, the valve 76 being coupled to an electric torque motor 78 here shown in a de-energized condition wherein it holds the valve equidistant from the nozzles to thereby equalize the pressures in the passages 64 and 66. The torque motor 78 operates in response to the magnitude and polarity of command signals to displace the flapper valve 76 in varying amounts to opposite sides of its centered position. For the purpose of selectively sending various desired command signals to the torque motor 78 there is provided a displacement control lever 80, here shown in a centered, neutral position, which is swingable to opposite sides of its neutral position to operate a command potentiometer 82 coupled to the torque motor 78, via control circuitry (not shown), such as to produce signals of increasing magnitude and of opposite polarity as the lever 80 is increasingly displaced to opposite sides of its neutral position. A feedback wire 84 is coupled between the spool 62 and the motor 78 and, when the spool reaches a commanded position, the wire 84 will counterbalance the electrical force exerted by the motor 78 so that the flapper valve 76 returns to its centered position resulting in the spool remaining in its commanded position.

The neutral control valve 38 is in the form of a two-position, on-off type valve coupled, as by a push-pull cable 86, for operation by the displacement control lever 80. The valve 38 is connected to the control fluid lines 48 and 50 and to control fluid lines 88 and 90, which are respectively coupled to the swashplate actuators 28 and 30. The valve 38 is also connected to the sump in a manner more specifically described hereinbelow but here represented by a passage 92. When the lever 80 is in its illustrated neutral position, the valve 38 is in a corresponding neutral position, as shown, wherein the control passages 48 and 50 are connected in fluid communication with each other, to the control fluid lines 88 and 90, and to the drain passage 92. Thus, fluid pressure is drained from the actuators 28 and 30 and the swashplate 18 is held in its zero-displacement effecting, central position by means of the neutraling springs 32 and 34. Upon the displacement control lever 80 being moved to opposite sides of its neutral position, the valve 38 will be shifted rightwardly to an active position wherein it connects the lines 48 and 50 respectively in fluid communication with the lines 88 and 90 while blocking flow to the drain passage 92.

Figure 3:
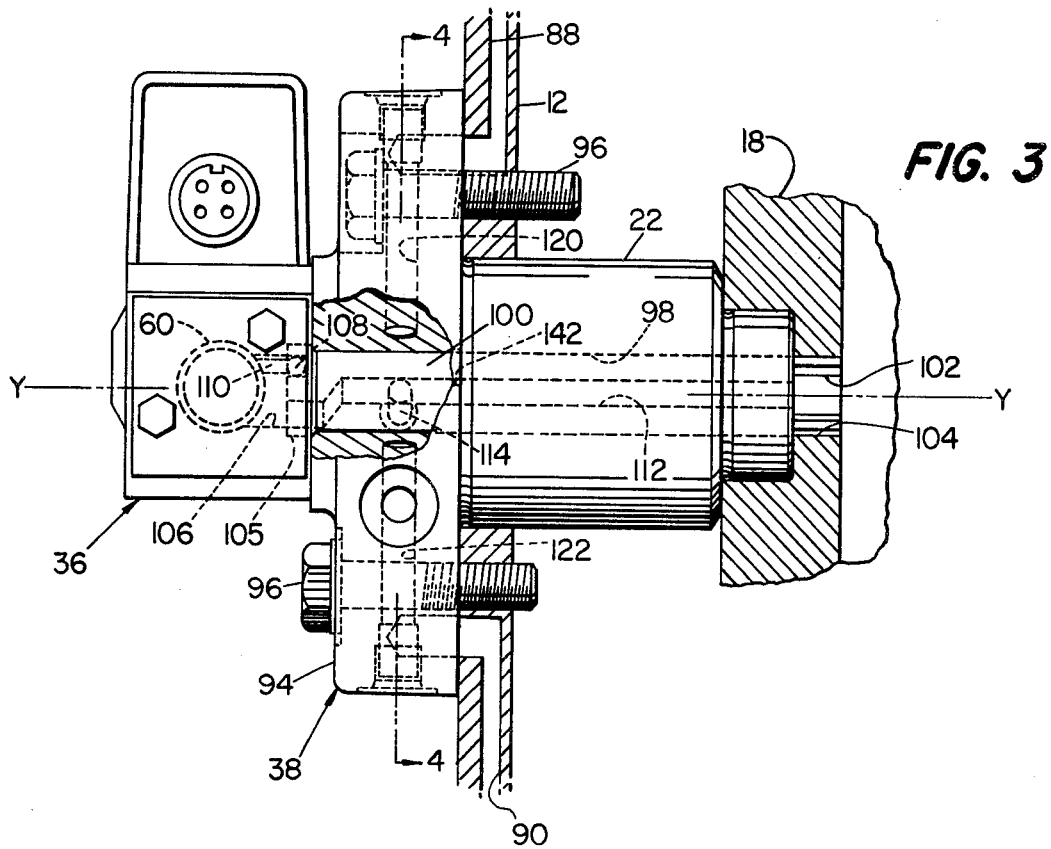
FIG. 3 is a view showing the positive neutral valve mounted between the transmission housing and the displacement control valve with portions broken away to show the connection of the positive neutral valve with the feedback shaft for connecting the swashplate actuators to sump when a zero displacement condition is commanded.
Figure 4:
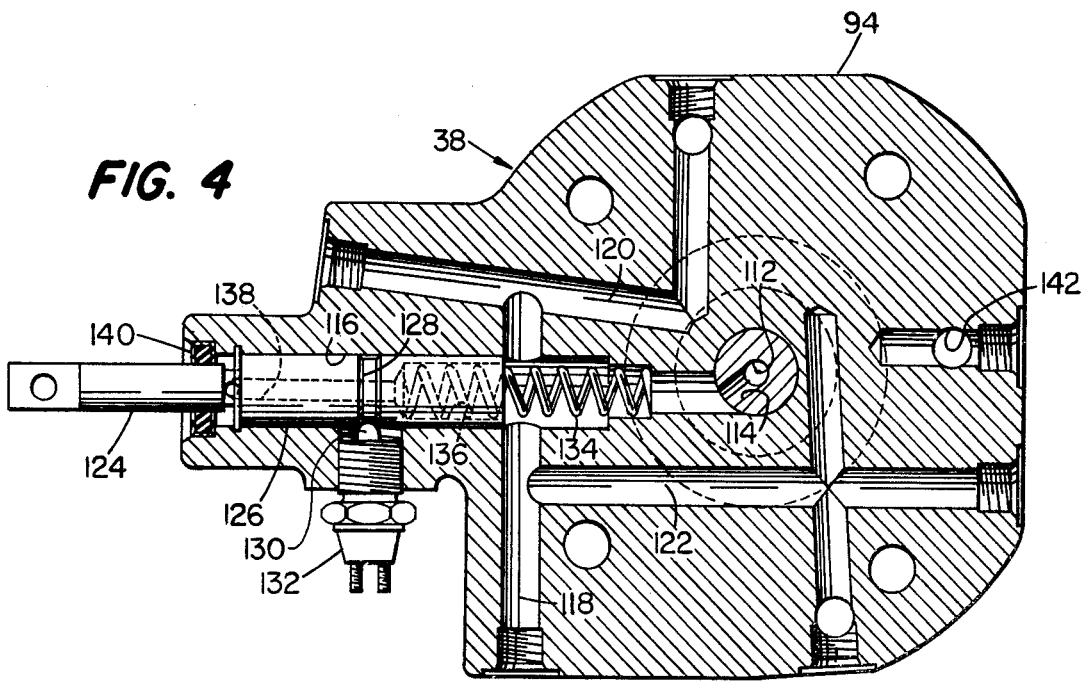
FIG. 4 is a longitudinal sectional view of the positive neutral valve taken along the line 4—4 of FIG. 3.

Referring now to FIGS. 3 and 4, therein is shown certain details of the neutral control valve 38. Specifically, the valve 38 includes a valve body 94 having the trunnion 22 formed as an integral part thereof, the body and, hence, the trunnion being fixed to the case 12 by a plurality of stud bolts 96. The body 94 is provided with a throughbore 98 which extends axially through the trunnion 22 and mounted for rotation in the throughbore 98 is a feedback shaft 100 having, as viewed in FIG. 3, a notched right end 102 pressed into an opening 104 in the swashplate 18 so as to effect an interference fit whereby the shaft 100 rotates together with the swashplate 18. The feedback shaft 100 functions to restore the follow-up sleeve 60 of the displacement control valve 36 to its centered relationship relative to the valve spool 62 and for this purpose includes an enlarged left end 105 located leftwardly of the valve body 94 and received in a complimentary right end portion of an opening 106 located centrally in the valve body 39. Provided in the shaft end 105 in eccentric relationship to the axis Y is a hole 108 in which is received a ball end of a rod 110 fixed to the sleeve 60. Thus, it will be appreciated that the sleeve 60 will be shifted axially in response to angular movement of the swashplate 18.

The opening 106 serves as the drain passage functionally represented by the port 42, illustrated in FIG. 2, and a drain passage 112 extends lengthwise through the feedback shaft 100 to thus communicate the opening 106 with the interior of the case 12, which serves as the fluid reservoir. The drain passage 112 also serves to drain control fluid from the actuators 28 and 30 to the interior of the case 12 when the neutral control valve 38 is in its illustrated neutral position, the passage 112 being represented functionally by the passage 92 shown in FIG. 2. Specifically, the feedback shaft 100 is provided with a passage 114 extending radially to the passage 112 and arranged so as to be in constant fluid communication with the right end (FIG. 4) of a valve bore 116, located in the valve body 94 in crosswise relationship to the throughbore 98, during the full range of movement of the shaft 100. The valve bore 116 is intersected by a cross passage 118. A first control fluid passage 120 is connected to the upper end (FIG. 4) of the cross passage 118, the control port 44, at the interface between the valve bodies 40 and 94, and to the passage 88 which is in the transmission case 12, at the interface between the valve body 94 and case 12. A second control fluid passage 122 is connected to the cross passage 118, at a location below the valve bore 116, to the control port 46, at the interface between the valve bodies 40 and 94, and to the passage 90, which is in the transmission case 12, at the interface between the valve body 94 and the case 12.

A valve spool 124 (FIG. 4) is axially shiftably mounted in the valve bore 116 for controlling fluid communication between the first and second control fluid passages 120 and 122 and the drain passage 112 via the radial passage 114. Specifically, the right end of the valve spool 124 is defined by a land 126 having a right end which is disposed leftwardly of the cross passage 118 when the displacement control lever 80 is in its illustrated neutral position. The passages 120 and 122 are then connected to each other and to the bore 116 by the cross passage 118, the bore 116 in turn leading to the radial passage 114. It is to be noted that when the valve spool 124 is so positioned, a groove 128 in the land 126 at a location intermediate of the ends of the land will be in register with an actuating element 130 of a neutral start switch 132, the switch 132 being connected in an ignition circuit (not shown) such as to effect a condition permitting start up of a vehicle employing the transmission 10 only when the element 130 is in register with the groove 128. The control cable 86 is connected between the lever 80 and valve spool 124 such that only a small amount of movement of the lever 80 to either side of its neutral position will be effective to displace the spool 124 inwardly in the bore 116 a distance sufficient to move the spool 124 into blocking relationship to the cross passage 118. A relatively soft spring 134 acts between the right end of the valve bore 116 and the bottom of a spring cavity 136 located in the right end of the spool 124 such as to give the spool stability. A bore 138 extends axially in the spool 124 and exits rightwardly of a seal 140 to ensure free movement of the spool.

It is here noted that the pump 58 is preferably located in the transmission case 12 and provided in the valve body 94 for conveying control fluid to a passage (not shown), in the valve body 40, which is connected to the supply ports 52 and 54, is a supply passage 142 (FIGS. 3 and 4).

It is to be understood that while the neutral control valve 38 is here shown separate and apart from the case 12, the case 12 could be modified to incorporate the operative features of the valve without departing from the principles of the present invention.

The operation of the invention is summarized as follows. Whenever the control lever 80 is in its illustrated neutral position, no electrical signal is generated for effecting actuation of the torque motor 78 of the displacement control valve 36 whereby the pressure delivered by the control fluid pressure supply pump 58 acts equally on the opposite ends of the valve spool 62 and holds the latter in a centered, neutral position wherein it blocks control fluid pressure from the control ports 44 and 46. At the same time the control lever 80 acts through the control cable 86 to hold the valve spool 124 of the neutral control valve in its neutral position wherein it connects the swashplate actuator 28 to sump via the passages 88, 120, 118, valve bore 116, passage 114 and passage 112 and connects the swashplate actuator 30 to sump via the passages 90, 122, 118, valve bore 116, passage 114 and passage 112. Thus, with the fluid pressure drained from the actuators 28 and 30, the neutraling springs 32 and 34 act to hold the swashplate 18 in its centered zero-displacement effecting position and the machine incorporating the transmission will not be driven.

Driving of the machine is accomplished by moving the control lever 80 a preselected amount forwardly or rearwardly of its neutral position which results in the valve spool 124 being pushed into the valve bore 116 a distance sufficient to block the cross passage 118 and hence, the first and second control fluid passages 120 and 122 from the sump. At the same time, the lever 80 effects generation of an electrical command signal having a polarity and magnitude corresponding to the direction and amount of movement of the lever 80 from its neutral position. The torque motor 78 then operates to move the flapper valve 76 to create an imbalance across the valve spool 62 resulting in the latter shifting in the commanded direction to route pressure fluid to one of the actuators 28 and 30 while connecting the other to sump. This causes the swashplate 18 to be adjusted angularly a distance corresponding to the signal commanded by the control lever 80. During movement of the swashplate 18 to its new position, the feedback shaft 100 restores the sleeve 60 to its centered position relative to the spool 62 and when so centered blocks the flow of fluid to and from the actuators 28 and 30. In the meantime, movement of the spool 62 has resulted in the feedback wire 84 being deflected sufficiently to offset the torque resulting from the signal generated by the control handle 80. The system is then in equilibrium and it so remains until a new command signal is generated by moving the lever 80 to a new position.

We claim:

1. In combination with a hydrostatic transmission and control therefor including a reversible, variable displacement pump having an angularly adjustable swashplate, servo-actuator means coupled to the swashplate, a pilot-operated displacement control valve coupled to the servo-actuator means by forward and reverse control fluid lines, biasing means urging the swashplate to a centered, zero-displacement effecting position, said actuator means being responsive to forward and reverse control fluid pressure for respectively effecting angular movement of the swashplate in opposite directions from its centered position, a command signal responsive means forming a part of the displacement control valve and being responsive to command signals for routing fluid to one or the other of the forward and reverse control fluid lines, and a control lever mounted for movement to opposite sides of a neutral position for respectively effecting transmission of common signal to the command signal responsive means, a positive neutral control for ensuring the swashplate will be in its neutral position whenever the control lever is in its neutral position, comprising: a neutral control valve fluidly connected to the forward and reverse control fluid lines and to a sump; said valve including a valve element operable between a neutral position connecting the forward and reverse fluid lines to the sump and a working position blocking the forward and reverse fluid lines from each other and from the sump; and connection means connecting the control lever to the valve element for retaining the latter in its neutral position only when the control lever is in its neutral position.

2. The combination defined in claim 1 wherein the neutral control valve includes a valve bore; said valve element being a valve spool axially shiftably mounted in the bore and including a land having an annular groove therein; and a neutral start switch having an actuating element mounted to register with said groove to effect a start condition only when the spool is in its neutral position.

3. The combination defined in claim 1 wherein said neutral control valve includes a valve bore; a cross passage intersecting with the bore and respectively coupled to the reverse and forward control pressure lines at locations on the opposite sides of the bore; a sump passage connected to the bore at a location to one side of the cross passage; and said valve element being a valve spool axially shiftably mounted in the bore such as to be in a location to a second side of the cross passage when the control lever is in its neutral position and located in blocking relationship to the cross passage when the control lever is in any position other than its neutral position.

4. In combination with a hydrostatic transmission and controls therefor including a reversible, variable displacement pump having an angularly adjustable swashplate normally biased to a centered, zero-displacement effecting position, swashplate actuator means coupled to the swashplate and responsive to commanded forward and reverse control fluid pressure for respectively displacing the swashplate in opposite directions from its centered, zero-displacement effecting position to positions in accordance with the commanded pressure, a pilot-operated displacement control valve coupled to the swashplate actuator means by forward and reverse control fluid pressure lines, and a control lever remote from the displacement control valve, and operatively coupled thereto for effecting pilot operation thereof such as to effect transmission of increasing forward and reverse control fluid pressure to the swashplate actuator means respectively in response to the control lever being increasingly displaced to opposite sides of a neutral position, a positive neutral control means, comprising: an "on-off" valve element fluidly connected to the forward and reverse control fluid pressure lines and to a sump line and movable between an "off" position, connecting the forward and reverse control fluid pressure lines to the sump line and an "on" position blocking fluid communication of the forward and reverse fluid pressure lines with each other and with the sump line.

* * * * *